(12) United States Patent
Zeng

(10) Patent No.: US 12,329,172 B1
(45) Date of Patent: Jun. 17, 2025

(54) SMOKING DEVICE FOR IMPARTING SMOKING FLAVOR TO BEVERAGES AND FOODS

(71) Applicant: Qi Zeng, Guangdong (CN)

(72) Inventor: Qi Zeng, Guangdong (CN)

( * ) Notice: Subject to any disclaimer, the term of this patent is extended or adjusted under 35 U.S.C. 154(b) by 0 days.

(21) Appl. No.: 18/952,154

(22) Filed: Nov. 19, 2024

(51) Int. Cl.
| | |
|---|---|
| *A23B 4/052* | (2006.01) |
| *A23B 4/044* | (2006.01) |
| *C12G 3/07* | (2006.01) |

(52) U.S. Cl.
CPC .............. *A23B 4/052* (2013.01); *A23B 4/044* (2013.01); *C12G 3/07* (2019.02)

(58) Field of Classification Search
CPC ............ A23B 4/052; A23B 4/044; C12G 3/07
USPC ............................................................ 99/482
See application file for complete search history.

(56) References Cited

U.S. PATENT DOCUMENTS

| | | | |
|---|---|---|---|
| 11,744,256 B2 * | 9/2023 | Sumner | C12G 3/07 |
| | | | 426/314 |
| 12,127,565 B1 * | 10/2024 | Qu | C12G 3/07 |
| 2014/0299005 A1 * | 10/2014 | Vinett | A23B 4/052 |
| | | | 99/482 |
| 2021/0227842 A1 * | 7/2021 | Middleton | A21B 1/28 |
| 2023/0301315 A1 * | 9/2023 | Guan | A23B 4/052 |

* cited by examiner

*Primary Examiner* — Reginald Alexander

(57) ABSTRACT

A smoking device for imparting smoking flavor to beverages and foods includes a base and a cover body. The base is provided with a first accommodating groove and a first accommodating opening. The first accommodating opening is connected to the first accommodating groove, and the first accommodating groove is configured to accommodate combustibles. The base is further provided with a first diversion groove and a smoke passage. The first accommodating groove, the first diversion groove and the smoke passage are connected in sequence, and the first diversion groove is configured to guide smoke generated by a combustion of the combustibles in the first accommodating groove to the smoke passage. A width of the first diversion groove is greater than a width of the first accommodating groove. The cover body is able to detachably cover the first accommodating opening.

19 Claims, 5 Drawing Sheets

SMOKING DEVICE FOR IMPARTING SMOKING FLAVOR TO BEVERAGES AND FOODS

TECHNICAL FIELD

The present invention relates to the field of smoking devices, and in particular to a smoking device for imparting smoking flavor to beverages and foods.

BACKGROUND

Traditionally, alcoholic beverages like cocktails are served either straight with ice or mixed with fruit juices or other mixing agents. For many spirits like whiskey, flavor is added traditionally by introducing the distilled spirit into American oak barrels or other types of oak barrels. However, the steps of imparting different flavors to beverages and foods in this way are extremely complex. It often requires professional deployment and thus significantly affect the user's experience. Therefore, there is an urgent need in the market to provide a smoking device for imparting a smoking flavor to beverages and foods, so that users can more easily and quickly impart a smoking flavor to beverages and foods.

SUMMARY

In order to overcome the deficiencies of the existing lamp, the present invention provides a smoking device for imparting smoking flavor to beverages and foods.

A smoking device for imparting smoking flavor to beverages and foods includes a base and a cover body. The base is provided with a first accommodating groove and a first accommodating opening, the first accommodating opening is connected to the first accommodating groove, and the first accommodating groove is configured to accommodate combustibles; the base is further provided with a first diversion groove and a smoke passage, the first accommodating groove, the first diversion groove and the smoke passage are connected in sequence, and the first diversion groove is configured to guide smoke generated by a combustion of the combustibles in the first accommodating groove to the smoke passage; a width of the first diversion groove is greater than a width of the first accommodating groove; and the cover body is able to detachably cover the first accommodating opening.

Further, the smoking device further includes a fireproof smoking filter mesh, the fireproof smoking filter mesh is provided with a filter hole part, and the filter hole part is interconnected to the first accommodating groove, the first diversion groove and the smoke passage; the fireproof smoking filter mesh is arranged in the first accommodating groove, and the fireproof smoking filter mesh is configured to accommodate the combustibles.

Further, the smoke passage includes a plurality of smoke outlets.

Further, the plurality of the smoke outlets are circumferentially arranged at a bottom of the base.

Further, the base includes a first part and a second part, the first diversion groove is arranged on the first part, and the first accommodating groove is arranged on the second part; the first part is provided with a first upper surface and a first lower surface, a lower side of the second part is connected to the first upper surface of the first part, the first accommodating opening is arranged on an upper side of the second part, and the smoke passage is arranged on the first lower surface.

Further, a width of the first part is greater than a width of the second part.

Further, the smoking device further includes a fireproof smoking filter mesh, the fireproof smoking filter mesh is arranged in the first accommodating groove, and the fireproof smoking filter mesh is configured to accommodate the combustibles; a first stop groove is located on the upper side of the second part, the first stop groove is positioned above the first accommodating groove, the fireproof smoking filter mesh includes a accommodating main body and a first stop edge extending from a sidewall of the accommodating main body, the accommodating main body is positioned in the first accommodating groove, and the first stop edge is positioned in the first stop groove; a width of the first stop groove is greater than the width of the first accommodating groove.

Further, a second stop groove is located on the upper side of the second part, the second stop groove is positioned above the first stop groove; the cover body is detachably arranged on the second stop groove; a width of the cover body is greater than the width of the first stop groove, and a width of the second stop groove is greater than the width of the first stop groove. Further, the first diversion groove is formed by a depression of the first upper surface.

Further, an inner bottom wall of the first diversion groove is depressed to form a first collection groove, and the first collection groove is configured to collect ashes produced by the combustion of the combustibles.

Further, an inner bottom wall of the first collection groove is depressed to form a second collection groove, the second collection groove is configured to collect the ashes produced by the combustion of the combustibles, and a width of the second collection groove is less than a width of the first collection groove.

Further, the first lower surface is a flat first lower surface, and the first lower surface is configured to cover a container opening.

Further, the first upper surface is an arc-shaped first upper surface.

Further, the smoke passage extends from the first lower surface to the first diversion groove.

Further, the cover body includes a covering part and a handle part, the covering part is provided with a second lower surface and a second upper surface, and the handle part is connected to the second upper surface.

Further, a recessed handle-grip position is provided at a junction between the handle part and the covering part.

Further, the second lower surface is a flat second lower surface, and the second lower surface covers the first accommodating opening.

Further, the second upper surface is an arc-shaped second upper surface; and the handle part is a spherical handle part.

Further, the base is a wooden base, a metal base or a bamboo base, and the cover body is a wooden cover body, a metal cover body or a bamboo cover body.

Further, the filter hole part includes a plurality of first filter holes and a plurality of second filter holes, the plurality of the first filter holes are arranged on a bottom wall of the fireproof smoking filter mesh, and the plurality of the second filter holes are arranged on a sidewall of the fireproof smoking filter mesh.

The present invention has the following beneficial effects. Through the above structure, the smoking device includes the base. The base is provided with the first accommodating groove and the first accommodating opening. The first accommodating opening is connected to the first accommodating groove, and the first accommodating groove is configured to accommodate the combustibles. The base is further provided with the first diversion groove and the smoke passage. The first accommodating groove, the first diversion groove and the smoke passage are connected in sequence. The first diversion groove is configured to guide the smoke generated by the combustion of the combustibles in the first accommodating groove 1 to the smoke passage. The width of the first diversion groove is greater than that of the first accommodating groove. There is also the cover body, and the cover body is detachably covered on the first accommodating opening. This enables the smoke generated after the combustion of the combustibles in the first accommodating groove to successively pass through the first diversion groove and the smoke passage and flow from the smoke passage into the beverages and foods in a container, imparting a smoking flavor to the beverages and foods. Further, since the width of the first diversion groove is greater than that of the first accommodating groove, the smoke generated by the combustion of the combustibles in the first accommodating groove can be diffused through the first diversion groove, maximizing the amount of smoke, improving the smoke emission effect, increasing the contact area between the smoke and the beverages and foods, and enhancing the smoking effect and smoking efficiency.

DETAILED DESCRIPTION OF THE DRAWINGS

Implementations of the present invention will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present invention.

DETAILED DESCRIPTION OF THE EMBODIMENTS

Figure 1:
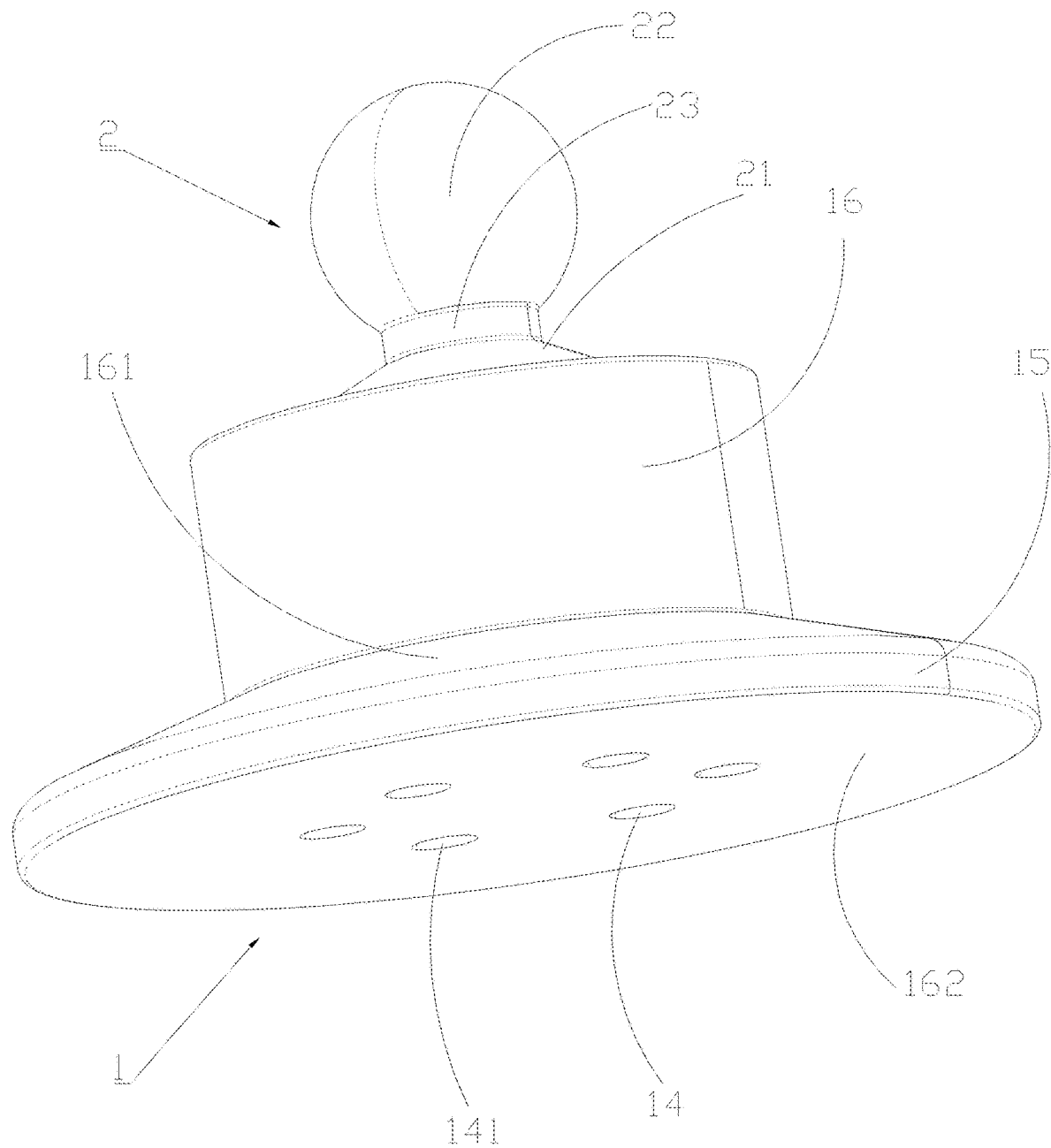
FIG. 1 is a schematic diagram of an overall structure of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present invention.

The term "comprising" when utilized, means "including, but not necessarily limited to"; it specifically indicates open-ended inclusion or membership in the so-described combination, group, series, and the like. The invention is illustrated by way of example and not by way of limitation in the figures of the accompanying drawings in which like references indicate similar elements. It should be noted that references to "an" or "one" embodiment in this invention are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
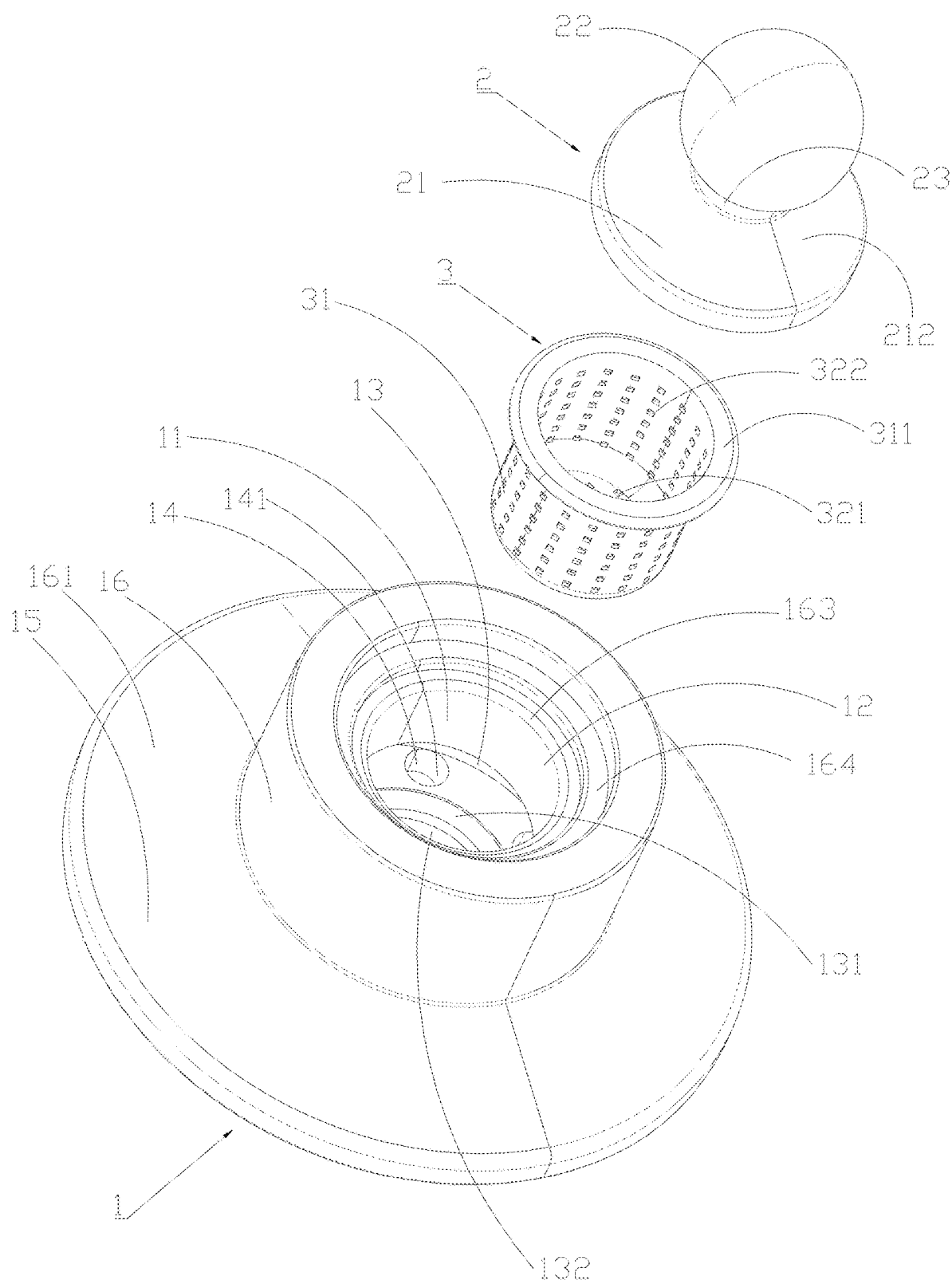
FIG. 2 is an exploded view of the present invention.
Figure 3:
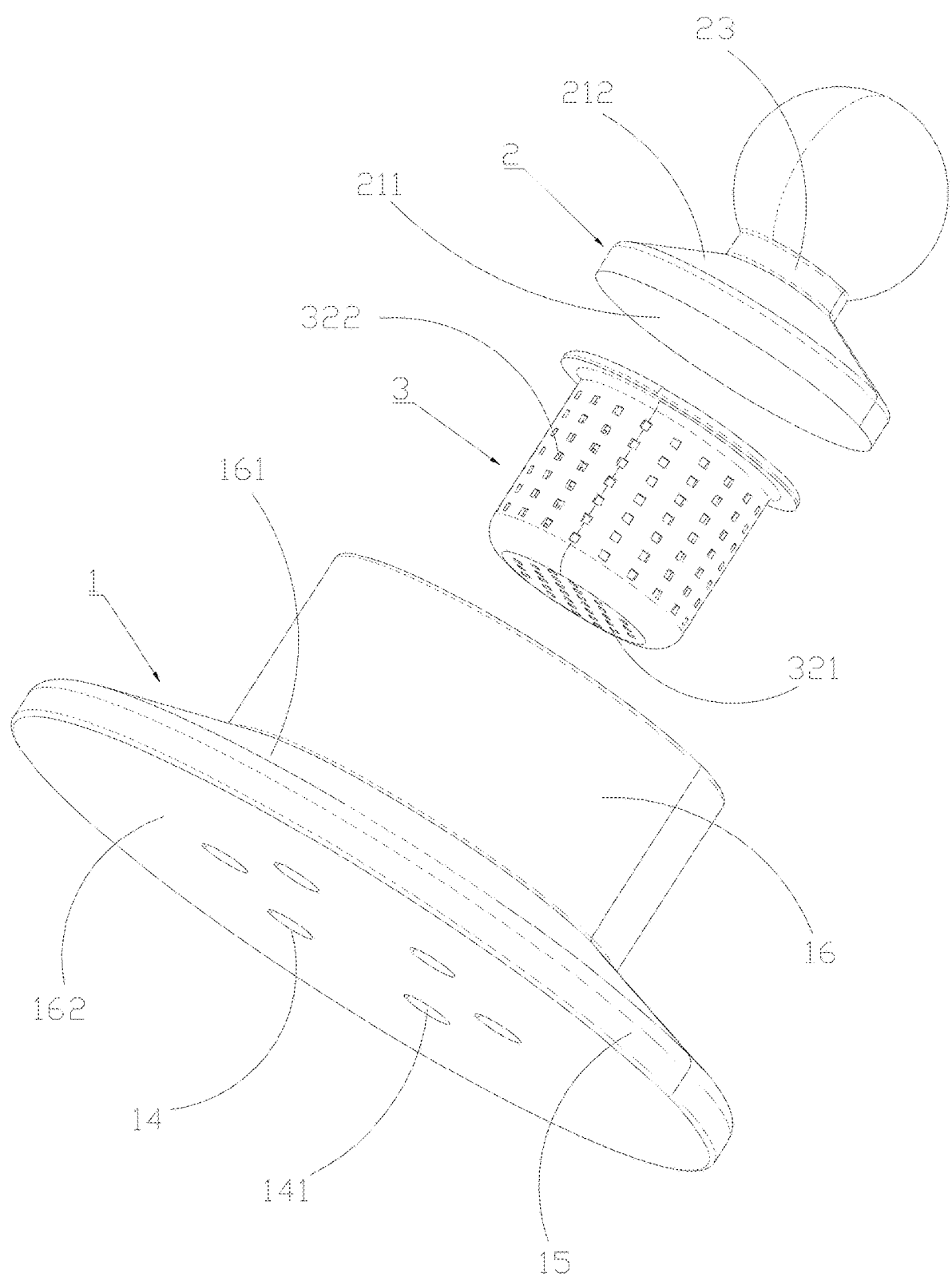
FIG. 3 is another exploded view of the present invention.
Figure 4:
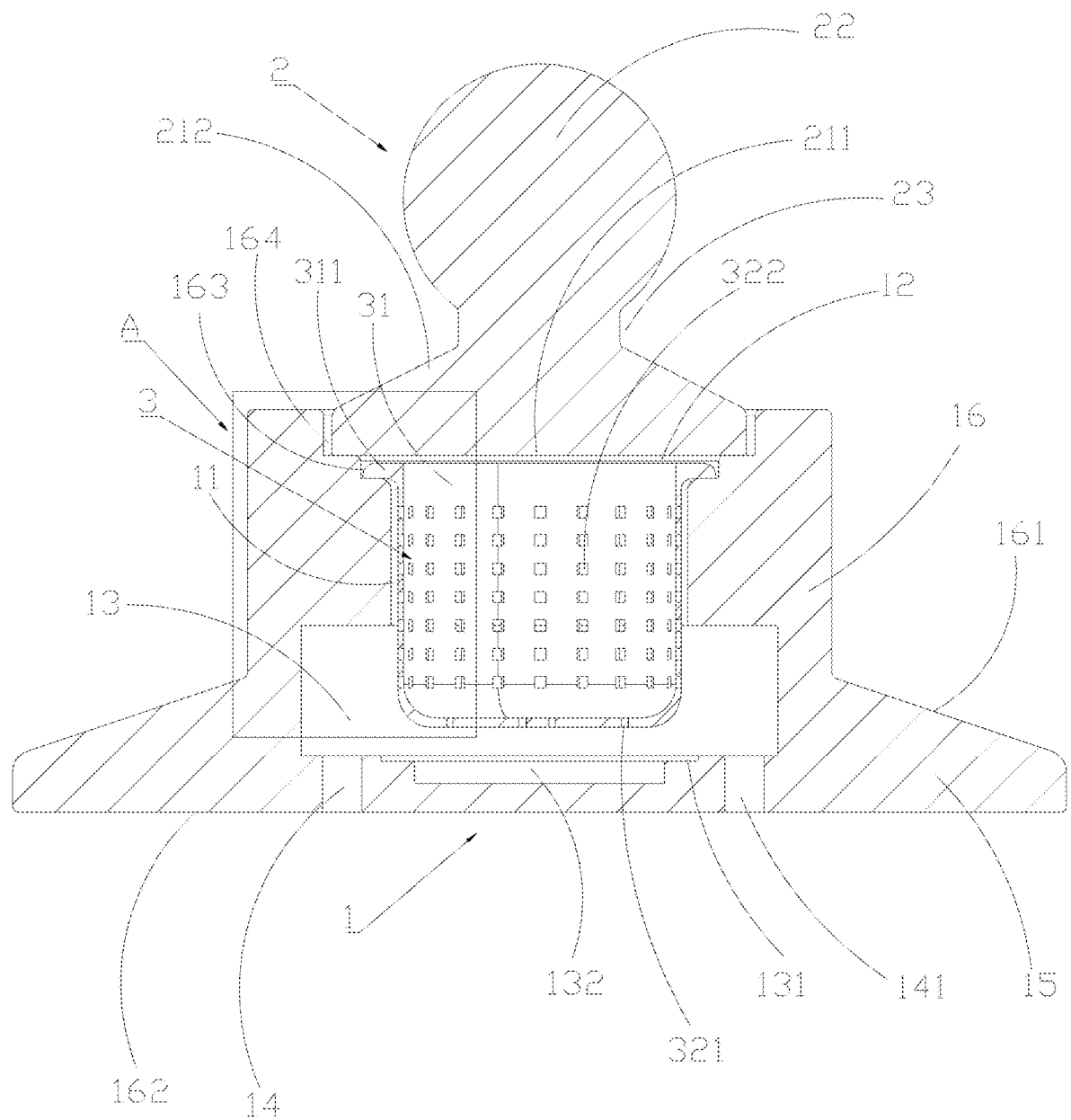
FIG. 4 is a cross-sectional view cut along a base, a cover body and a fireproof smoking filter mesh.
Figure 5:
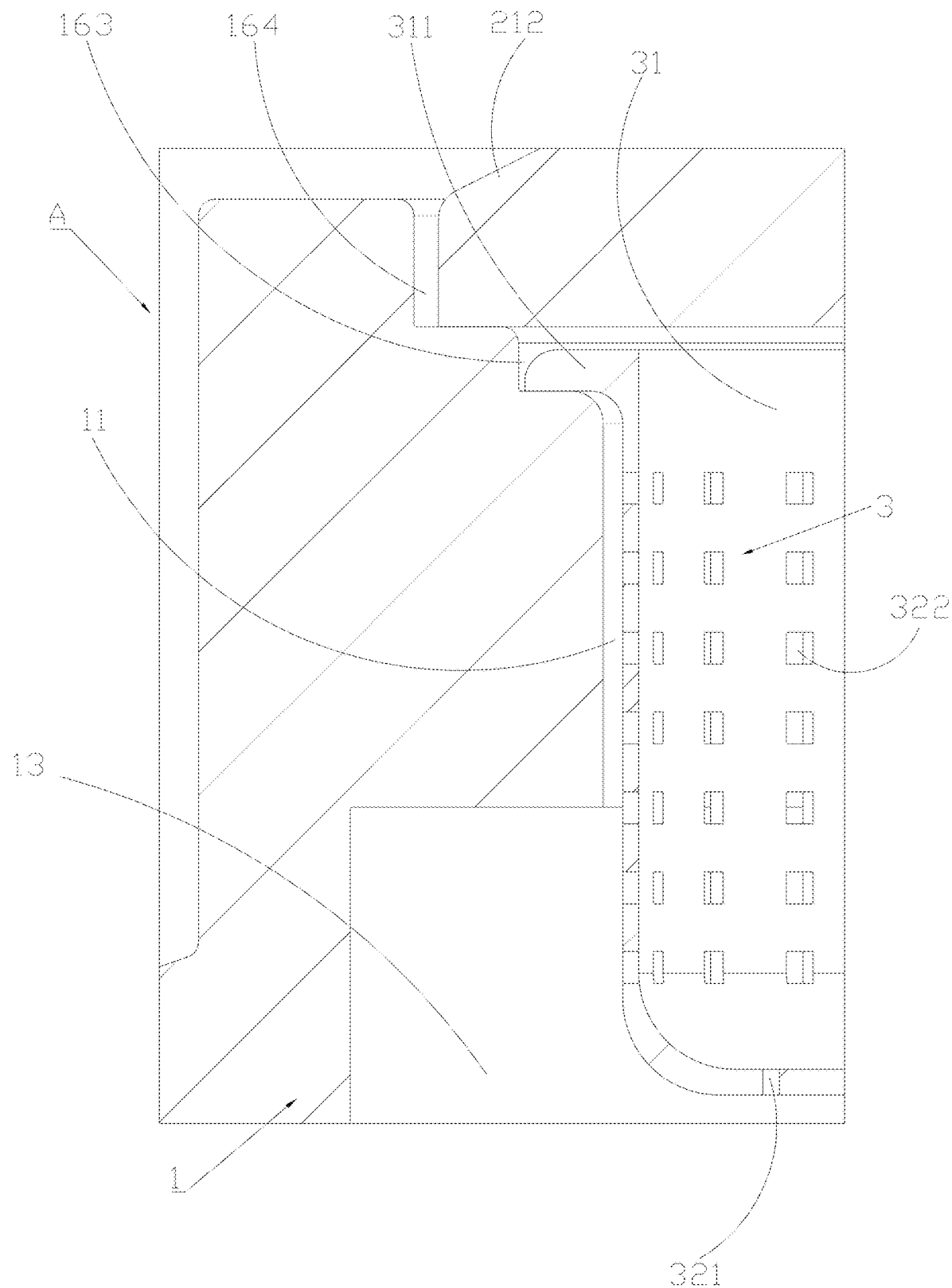
FIG. 5 is an enlarged diagram of an area A of FIG. 4.

Referring to FIG. 1 to FIG. 5, a smoking device for imparting a smoking flavor to beverages and foods includes a base 1, the base 1 is provided with a first accommodating groove 11 and a first accommodating opening 12, the first accommodating opening 12 is connected to the first accommodating groove 11, and the first accommodating groove 11 is configured to accommodate combustibles; the base 1 is further provided with a first diversion groove 13 and a smoke passage 14, the first accommodating groove 11, the first diversion groove 13 and the smoke passage 14 are connected in sequence, and the first diversion groove 13 is configured to guide smoke generated by a combustion of the combustibles in the first accommodating groove 11 to the smoke passage 14; and a width of the first diversion groove 13 is greater than a width of the first accommodating groove 11; the smoking device further includes a cover body 2, and the cover body 2 is able to detachably cover the first accommodating opening 12.

Through the above structure, the smoking device includes the base 1. The base 1 is provided with the first accommodating groove 11 and the first accommodating opening 12. The first accommodating opening 12 is connected to the first accommodating groove 11, and the first accommodating groove 11 is configured to accommodate the combustibles. The base 1 is further provided with the first diversion groove 13 and the smoke passage 14. The first accommodating groove 11, the first diversion groove 13 and the smoke passage 14 are connected in sequence. The first diversion groove 13 is configured to guide the smoke generated by the combustion of the combustibles in the first accommodating groove 11 to the smoke passage 14. The width of the first diversion groove 13 is greater than that of the first accommodating groove 11. There is also the cover body 2, and the cover body 2 is detachably covered on the first accommodating opening 12. This enables the smoke generated after the combustion of the combustibles in the first accommodating groove 11 to successively pass through the first diversion groove 13 and the smoke passage 14 and flow from the smoke passage 14 into the beverages and foods in a container, imparting a smoking flavor to the beverages and foods. Further, since the width of the first diversion groove 13 is greater than that of the first accommodating groove 11, the smoke generated by the combustion of the combustibles in the first accommodating groove 11 can be diffused through the first diversion groove 13, maximizing the amount of smoke, improving the smoke emission effect, increasing the contact area between the smoke and the beverages and foods, and enhancing the smoking effect and smoking efficiency.

In this embodiment, the smoking device further includes a fireproof smoking filter mesh 3, the fireproof smoking filter mesh 3 is provided with a filter hole part 32, and the filter hole part 32 is interconnected to the first accommodating groove 11, the first diversion groove 13 and the smoke passage 14; the fireproof smoking filter mesh 3 is arranged in the first accommodating groove 11, and the fireproof smoking filter mesh 3 is configured to accommodate the combustibles. Moreover, the fireproof smoking filter mesh 3 is a metal fireproof smoking filter mesh 3.

Specifically, the filter hole part 32 includes a plurality of first filter holes 321 and a plurality of second filter holes 322, the plurality of the first filter holes 321 are arranged on a bottom wall of the fireproof smoking filter mesh 3, and the plurality of the second filter holes 322 are arranged on a sidewall of the fireproof smoking filter mesh 3.

Through the above structure, the combustibles burn inside the fireproof smoking filter mesh 3, which is safer. The design of the filter hole part 32 not only enables the combustibles to burn more thoroughly, improving the combustion efficiency, but also facilitates the rapid diffusion of the smoke generated by the combustion of the combustibles to the first diversion groove 13 and the smoke passage 14.

In this embodiment, the smoke passage includes a plurality of smoke outlets 141, and the plurality of the smoke outlets are circumferentially arranged at a bottom of the base 1. The specific number of the smoke outlets 141 is six, and the six smoke outlets 141 are arranged circumferentially at the bottom of the base 1.

Through the above structure, the plurality of smoke outlets 141 that are circumferentially arranged at the bottom of the base 1 can introduce smoke into the beverages and foods from multiple positions, enabling the smoke to spread more evenly to all parts of the beverages and foods and quickly blend with them.

In this embodiment, the base 1 includes a first part 15 and a second part 16, the first diversion groove 13 is arranged on the first part 15, and the first accommodating groove 11 is arranged on the second part 16; the first part 15 is provided with a first upper surface 161 and a first lower surface 162, a lower side of the second part 16 is connected to the first upper surface 161 of the first part 15, the first accommodating opening 12 is arranged on an upper side of the second part 16, and the smoke passage 14 is arranged on the first lower surface 162. A width of the first part 15 is greater than a width of the second part 16.

Specifically, the smoking device further includes a fireproof smoking filter mesh 3, the fireproof smoking filter mesh 3 is arranged in the first accommodating groove 11, and the fireproof smoking filter mesh 3 is configured to accommodate the combustibles. A first stop groove 163 is located on the upper side of the second part 16, and the first stop groove 163 is positioned above the first accommodating groove 11. The fireproof smoking filter mesh 3 includes a accommodating main body 31 and a first stop edge 311 extending from a sidewall of the accommodating main body 31, the accommodating main body 31 is positioned in the first accommodating groove 11, and the first stop edge 311 is positioned in the first stop groove 163. A width of the first stop groove 163 is greater than the width of the first accommodating groove 11.

Further, a second stop groove 164 is located on the upper side of the second part 16, and the second stop groove 164 is positioned above the first stop groove 163. The cover body 2 is detachably arranged on the second stop groove 164. A width of the cover body 2 is greater than the width of the first stop groove 163, and a width of the second stop groove 164 is greater than the width of the first stop groove 163.

Furthermore, the first diversion groove 13 is formed by a depression of the first upper surface 161.

Through the above structure, the installation of the cover body 2 and the fireproof smoking filter mesh 3 is effectively achieved.

In this embodiment, an inner bottom wall of the first diversion groove 13 is depressed to form a first collection groove 131, and the first collection groove 131 is configured to collect ashes produced by the combustion of the combustibles.

Through the above structure, the first collection groove 131 can collect the ashes produced by the combustion of the combustibles, preventing the ashes from falling into the beverages and foods. In this way, the taste of the beverages and foods is protected from the influence of the ashes, which greatly improves the user experience.

In this embodiment, an inner bottom wall of the first collection groove 131 is depressed to form a second collection groove 132, the second collection groove 132 is configured to collect the ashes produced by the combustion of the combustibles, and a width of the second collection groove 132 is less than a width of the first collection groove 131.

Through the above structure, the first collection groove 131 and the second collection groove 132 can jointly collect the ashes, increasing the amount of ash collection and preventing the ashes from overflowing from the first collection groove 131 and the second collection groove 132.

In this embodiment, the first lower surface 162 is a flat first lower surface 162, and the first lower surface 162 is configured to cover a container opening.

Through the above structure, since the first lower surface 162 is flat and configured to cover the container opening, it is possible to prevent the first lower surface 162 of the base 1 from directly contacting the beverages and foods in the container and from being contaminated by them. However, in some existing methods in the market, the smoke outlet is arranged on a protruding structure on the lower surface of the base 1. The protruding structure enters the container, so that the beverages and foods in the container are easily contaminated, affecting the use experience.

In this embodiment, the first upper surface 161 is an arc-shaped first upper surface 161.

Through the above structure, the arc-shaped first upper surface 161 is more beautiful. Moreover, the first diversion groove 13 can be enlarged while the amount of the molding material of the base 1 is reduced to the maximum extent.

In this embodiment, the smoke passage 14 extends from the first lower surface 162 to the first diversion groove 13.

Through the above structure, it is convenient for the smoke produced after the combustion of the combustibles in the first accommodating groove 11 to pass through the first diversion groove 13 and the smoke passage 14 in sequence and then flow into the beverages and foods in the container from the smoke passage 14, thus imparting a smoked flavor to the beverages and foods.

In this embodiment, the cover body 2 includes a covering part 21 and a handle part 22, the covering part 21 is provided with a second lower surface 211 and a second upper surface 212, and the handle part 22 is connected to the second upper surface 212.

A recessed handle-grip position 23 is provided at a junction between the handle part 22 and the covering part 21.

Specifically, the second lower surface 211 is a flat second lower surface 211, and the second lower surface 211 covers the first accommodating opening 12.

Furthermore, the second upper surface 212 is an arc-shaped second upper surface 212, and the handle part 22 is a spherical handle part 22.

Through the above structure, the flat second lower surface 211 can better cover the first accommodating opening 12, preventing the smoke from overflowing from the first accommodating opening 12. Moreover, due to the arrangement of the handle, the cover body 2 can be conveniently lifted and placed by a user.

In this embodiment, the base 1 is a wooden base 1, a metal base 1 or a bamboo base 1, and the cover body 2 is a wooden cover body 2, a metal cover body 2 or a bamboo cover body 2.

Through the above structure, the wooden base 1, the metal base 1 or the bamboo base 1 is not only convenient for production but also has a long service life. The wooden cover body 2, the metal cover body 2 or the bamboo cover body 2 is not only convenient for production but also has a long service life.

In this embodiment, the first part 15 is a circular first part 15, the second part 16 is a circular second part 16; the first accommodating groove 11 is a circular first accommodating groove 11, the first diversion groove 13 is a circular first diversion groove 13, and the smoke outlet 141 is a circular smoke outlet 141. Moreover, the covering part 21 is a circular covering part 21, the first stop groove 163 is a circular first stop groove 163, the second stop groove 164 is a circular second stop groove 164, the first collection groove 131 is a circular first collection groove 131, and the second collection groove 132 is a circular second collection groove 132.

In this embodiment, a depth of the first diversion groove is less than a depth of the first accommodating groove. The depth of the first diversion groove is greater than a depth of the first collection groove. The depth of the first diversion groove is greater than a depth of the second collection groove. The depth of the first diversion groove is greater than a depth of the first stop groove. The depth of the first diversion groove is greater than a depth of the second stop groove. A depth of the smoke passage is greater than the sum of the depths of the first collection groove and the second collection groove. The depth of the second stop groove is greater than the depth of the first stop groove. A height of the handle part is greater than a height of the covering part. A width of the handle part is less than a width of the covering part. A height of the second part is greater than a height of the first part. A depth of the fireproof smoking filter mesh is greater than the depth of the first accommodating groove, and at least one part of the fireproof smoking filter mesh extends into the first diversion groove. A distance is reserved between a bottom of the fireproof smoking filter mesh and an inner wall of the first diversion groove. The first collection groove and the second collection groove are positioned below the fireproof smoking filter mesh. A width of the covering part is less than a width of the second part. Moreover, the second part is connected to the first part by integral molding.

Through the above structure, the design is reasonable, and the structure is compact, so that the smoking effect is improved, the smoking device is still small, and the smoking device is convenient for a user to store and carry.

The above description only describes embodiments of the present invention, and is not intended to limit the present invention; various modifications and changes can be made to the present invention. Any modifications, equivalent substitutions, and improvements made within the spirit and scope of the present invention are intended to be included within the scope of the present invention.

What is claimed is:

1. A smoking device for imparting smoking flavor to beverages and foods, comprising:
a base, wherein the base is provided with a first accommodating groove and a first accommodating opening, the first accommodating opening is connected to the first accommodating groove, and the first accommodating groove is configured to accommodate combustibles; the base is further provided with a first diversion groove and a smoke passage, the first accommodating groove, the first diversion groove and the smoke passage are connected in sequence, and the first diversion groove is configured to guide smoke generated by a combustion of the combustibles in the first accommodating groove to the smoke passage; a width of the first diversion groove is greater than a width of the first accommodating groove; and
a cover body, wherein the cover body is able to detachably cover the first accommodating opening,
wherein the base comprises a first part and a second part, the first diversion groove is arranged on the first part, and the first accommodating groove is arranged on the second part; the first part is provided with a first upper surface and a first lower surface, a lower side of the second part is connected to the first upper surface of the first part, the first accommodating opening is arranged on an upper side of the second part, and the smoke passage is arranged on the first lower surface.

2. The smoking device according to claim 1, wherein the smoking device further comprises a fireproof smoking filter mesh, the fireproof smoking filter mesh is provided with a filter hole part, and the filter hole part is interconnected to the first accommodating groove, the first diversion groove and the smoke passage; the fireproof smoking filter mesh is arranged in the first accommodating groove, and the fireproof smoking filter mesh is configured to accommodate the combustibles.

3. The smoking device according to claim 1, wherein the smoke passage comprises a plurality of smoke outlets.

4. The smoking device according to claim 3, wherein the plurality of smoke outlets are circumferentially arranged at a bottom of the base.

5. The smoking device according to claim 1, wherein a width of the first part is greater than a width of the second part.

6. The smoking device according to claim 1, wherein the smoking device further comprises a fireproof smoking filter mesh, the fireproof smoking filter mesh is arranged in the first accommodating groove, and the fireproof smoking filter mesh is configured to accommodate the combustibles; a first stop groove is located on the upper side of the second part, the first stop groove is positioned above the first accommodating groove, the fireproof smoking filter mesh comprises a accommodating main body and a first stop edge extending from a sidewall of the accommodating main body, the accommodating main body is positioned in the first accommodating groove, and the first stop edge is positioned in the first stop groove; a width of the first stop groove is greater than the width of the first accommodating groove.

7. The smoking device according to claim 6, wherein a second stop groove is located on the upper side of the second part, the second stop groove is positioned above the first stop groove; the cover body is detachably arranged on the second stop groove; a width of the cover body is greater than the width of the first stop groove, and a width of the second stop groove is greater than the width of the first stop groove.

8. The smoking device according to claim 1, wherein the first diversion groove is formed by a depression of the first upper surface.

9. The smoking device according to claim 1, wherein the first lower surface is a flat first lower surface, and the first lower surface is configured to cover a container opening.

10. The smoking device according to claim 1, wherein the first upper surface is an arc-shaped first upper surface.

11. The smoking device according to claim 1, wherein the smoke passage extends from the first lower surface to the first diversion groove.

12. The smoking device according to claim 1, wherein the base is a wooden base, a metal base or a bamboo base, and the cover body is a wooden cover body, a metal cover body or a bamboo cover body.

13. The smoking device according to claim 2, wherein the filter hole part comprises a plurality of first filter holes and a plurality of second filter holes, the plurality of the first filter holes are arranged on a bottom wall of the fireproof smoking filter mesh, and the plurality of the second filter holes are arranged on a sidewall of the fireproof smoking filter mesh.

14. A smoking device for imparting smoking flavor to beverages and foods, comprising:
    a base, wherein the base is provided with a first accommodating groove and a first accommodating opening, the first accommodating opening is connected to the first accommodating groove, and the first accommodating groove is configured to accommodate combustibles; the base is further provided with a first diversion groove and a smoke passage, the first accommodating groove, the first diversion groove and the smoke passage are connected in sequence, and the first diversion groove is configured to guide smoke generated by a combustion of the combustibles in the first accommodating groove to the smoke passage; a width of the first diversion groove is greater than a width of the first accommodating groove; and
    a cover body, wherein the cover body is able to detachably cover the first accommodating opening,
    wherein an inner bottom wall of the first diversion groove is depressed to form a first collection groove, and the first collection groove is configured to collect ashes produced by the combustion of the combustibles.

15. The smoking device according to claim 14, wherein an inner bottom wall of the first collection groove is depressed to form a second collection groove, the second collection groove is configured to collect the ashes produced by the combustion of the combustibles, and a width of the second collection groove is less than a width of the first collection groove.

16. A smoking device for imparting smoking flavor to beverages and foods, comprising:
    a base, wherein the base is provided with a first accommodating groove and a first accommodating opening, the first accommodating opening is connected to the first accommodating groove, and the first accommodating groove is configured to accommodate combustibles; the base is further provided with a first diversion groove and a smoke passage, the first accommodating groove, the first diversion groove and the smoke passage are connected in sequence, and the first diversion groove is configured to guide smoke generated by a combustion of the combustibles in the first accommodating groove to the smoke passage; a width of the first diversion groove is greater than a width of the first accommodating groove; and
    a cover body, wherein the cover body is able to detachably cover the first accommodating opening,
    wherein the cover body comprises a covering part and a handle part, the covering part is provided with a second lower surface and a second upper surface, and the handle part is connected to the second upper surface.

17. The smoking device according to claim 16, wherein a recessed handle-grip position is provided at a junction between the handle part and the covering part.

18. The smoking device according to claim 16, wherein the second lower surface is a flat second lower surface, and the second lower surface covers the first accommodating opening.

19. The smoking device according to claim 16, wherein the second upper surface is an arc-shaped second upper surface; and the handle part is a spherical handle part.

* * * * *